United States Patent
Conte et al.

(10) Patent No.: US 8,063,693 B2
(45) Date of Patent: Nov. 22, 2011

(54) ELECTRONIC CIRCUIT FOR GENERATING LOW VOLTAGE AND HIGH FREQUENCY PHASES IN A CHARGE PUMP

(75) Inventors: Antonino Conte, Tremestieri Etneo (IT); Carmelo Ucciardello, Catania (IT); Giovanni Matranga, Catania (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 0 days.

(21) Appl. No.: 12/559,967

(22) Filed: Sep. 15, 2009

(65) Prior Publication Data

US 2010/0127760 A1    May 27, 2010

(30) Foreign Application Priority Data

Sep. 18, 2008  (EP) ................................ 08425608

(51) Int. Cl.
  *G05F 1/10* (2006.01)
  *G05F 3/02* (2006.01)
(52) U.S. Cl. .......................................... 327/536
(58) Field of Classification Search ........... 327/535–537
  See application file for complete search history.

(56) References Cited

U.S. PATENT DOCUMENTS

| 7,583,132 B2 * | 9/2009 | Conte et al. ................... 327/536 |
| 2001/0026187 A1 * | 10/2001 | Oku .............................. 327/536 |
| 2002/0084834 A1 * | 7/2002 | Nakamura ....................... 327/536 |
| 2004/0239409 A1 | 12/2004 | Jang et al. |
| 2006/0244516 A1 | 11/2006 | Lee et al. |

FOREIGN PATENT DOCUMENTS

EP    1 881 589 A1   1/2008

OTHER PUBLICATIONS

Search Report for corresponding European Patent Application EP 08 42 5608.

* cited by examiner

*Primary Examiner* — Quan Tra
(74) *Attorney, Agent, or Firm* — Lisa K. Jorgenson; Stephen Bongini; Fleit Gibbons Gutman Bongini & Bianco P.L.

(57) ABSTRACT

A charge pump latch circuit is provided that includes at least one first and at least one second charge pump stage interconnected by an intermediate circuit node, and a stabilization stage connected to the intermediate circuit node and to control terminals of transistors of the first and second charge pump stages. The stabilization stage includes at least one first pair and at least one second pair of first and second enable terminals receiving suitable and distinct phase signals that ensure the turn-off of the stabilization stage during overlapping periods of the phase signals. Also provided is a method for using a stabilization stage to drive transistors in first and second charge pump stages that are interconnected by an intermediate circuit node.

17 Claims, 13 Drawing Sheets

ELECTRONIC CIRCUIT FOR GENERATING LOW VOLTAGE AND HIGH FREQUENCY PHASES IN A CHARGE PUMP

CROSS-REFERENCE TO RELATED APPLICATIONS

This application is based upon and claims priority from European Patent Application No. 08 425608.0, filed Sep. 18, 2008, the entire disclosure of which is herein incorporated by reference.

FIELD OF THE INVENTION

The present invention relates to an electronic circuit for generating low voltage and high frequency phases in a charge pump, and more specifically relates to a charge pump latch circuit having first and second charge pump stages interconnected at an intermediate circuit node and a stabilization stage connected to the intermediate circuit node.

BACKGROUND OF THE INVENTION

As is well known, charge pump circuits are widely used in many electronic devices to obtain voltage values higher than a supply reference by using capacitors as charge storage elements. A classic charge pump circuit normally comprises four capacitors suitably connected to four enable signals, or phases, of the charge pump circuit.

A four-phase charge pump circuit is able to operate in a range of frequencies equal to 10-50 MHz. However, this range is insufficient for some applications.

Charge pump latch circuits are known to be able to output signals at rather high frequencies (e.g., 100 MHz and more), with respect to the traditional four-phase charge pump circuits which reach their maximum at 50 Mhz. This is possible since the charge pump latch circuits operate with only two phases and only use low voltage transistors.

A conventional charge pump circuit of the latch type is shown in FIG. 1. The charge pump latch circuit 1 has an input terminal IN connected to a first voltage reference (in particular the supply voltage Vdd), and an output terminal OUT connected to a load, which is illustrated by the parallel of a load capacitor CL and a load current generator IL inserted between this output terminal OUT and a second voltage reference (in particular the ground GND).

The charge pump latch circuit 1 comprises a plurality of N charge pump stages CB1-CBN inserted in cascade between the input IN and output OUT terminals and connected to a first enable terminal FX and to a second enable terminal FN supplying respective first and second enable signals, or phases (which for the sake of simplicity likewise are indicated with the references FX and FN). In particular, the enable signals, or phases, FX and FN are complementary to each other.

The charge pump latch circuit 1 is thus a two-phase circuit, able to operate at rather high frequencies (e.g., 100 MHz and more), due to the presence of suitable latch circuits L1-LN inserted in each charge pump stage CB1-CBN.

In more detail, each charge pump stage CBN comprises at least one first pump capacitor CUp and one second pump capacitor CDown inserted between the first enable terminal FX and a first inner circuit node Up and between the second enable terminal FN and a second inner circuit node Down, respectively.

Each charge pump stage CBN also comprises a respective latch circuit LN that is inserted between the first inner circuit node Up and the second inner circuit node Down and that comprises Low Voltage (or LV) transistors. In particular, each latch circuit LN comprises at least one pair of N-channel MOS transistors and a pair of P-channel MOS transistors, suitably connected to form opposite pairs of CMOS switches having control terminals or gates connected to the enable terminals FX and FN, for the alternating connection (and the relative charge sharing) of the pump capacitors CUp and CDown.

Since the charge pump stages CB1-CBN are placed in parallel, in the operation of the latch circuit 1 consecutive stages work in phase opposition with each other and the enable signals, or phases, FX and FN are at any time complementary to each other.

It is interesting to note that the voltage value VInt on an intermediate circuit node INT between two consecutive charge pump stages is kept practically constant during the whole clock period. Moreover, the widening of the range of operation frequencies allows a reduction in the sizes of the charge pump capacitors CUp and CDown and thus of the area occupied by the latch circuit 1 as a whole.

However, while the use of these charge pump capacitors CUp and CDown for the turn-on and the turn-off of the transistors of the latch circuit 1 allows there to be obtained a remarkable circuit simplification for the latch circuit itself, on the other hand they constitute a limit in the supply of current to the circuit, in particular when the supply voltage Vdd becomes close to the threshold voltage of the transistors in the latch circuit 1 or when the same is requested to supply a greater and greater current value.

In general, charge pump latch circuits do not operate very well at very low supply voltages. It is in fact possible to verify that, when the supply voltage Vdd decreases, a charge pump latch circuit of the type shown in FIG. 1 does not succeed in supplying a sufficient load current IL.

To overcome this limit, a charge pump latch circuit has been provided with a stabilization circuit connected to the enable terminals FX and FN in order to ensure a correct biasing of the transistors during the charge sharing periods.

For example, one solution described in European Patent Application No. 06 425497.2 of the same Assignee proposes the use of supplementary capacities only when the supply voltage becomes close to the threshold voltage of the transistors or when the charge pump latch circuit is requested to supply a greater and greater current. These supplementary capacities, by biasing the gate terminals of the pass transistors, allow the correct turn-on and turn-off of the same up to the end of the charge sharing.

This solution, even though it is able to operate with supply voltages lower than 1V, loses the typical characteristic of the charge pump latch circuits, i.e., the capacity of turning on and off the pass transistors slowly so as to avoid stressing the thin oxide layers whereon the gate areas of such transistors are realized.

Moreover, during switches at high frequency some asymmetries occur in the biasing voltages of the pass transistors between the upper and the lower circuit portion of the latch circuit.

These two drawbacks could cause stress on the oxides and an improper operation of the charge pump latch circuit, so as not to allow the meeting of the current and voltage requirements.

FIG. 2 shows a view of the charge pump latch circuit described in European Patent Application No. 06 425497.2. In this circuit, the phases FX and FN are, at any time, complementary to each other.

There are two different equivalent conditions as follows.

1) $FN=V_{dd}$, $FX=0$, $V_{cD(i-1)}$ is brought high, $V_{cU(i-1)}$ is brought low, $V_{cD(i)}$ is low while $V_{cUpi}$ is high. In this case the node $P_{gU}$ is brought high (at $V_i$) while the node $P_{gD}$ is bought low (by a $V_{dd}$ with respect to a $V_i$), thus allowing the turning on of the transistor $M_{pD}$ and the turning off the transistor $M_{pU}$. In the same semi-period the node $N_{gD}$ is brought high (by a $V_{dd}$ with respect to Vi) and the node $N_{gU}$ is brought low. Thus the transistor $M_{nD}$ is turned on, while the transistor $M_{nU}$ is turned off. In this way, the charge pump latch circuit of FIG. 2 allows there to be obtained the charge sharing between the two adjacent bottom capacities, connected to the nodes $V_{cD}(i-1)$ and $V_{cD}(i)$, while it is forbidden between the two upper capacities, connected to the nodes $V_{cU}(i-1)$ and $V_{cU}(i)$.

2) $FN=0$, $FX=V_{dd}$. In this case the latch circuit of FIG. 2 operates in a similar way to the previous situation. However, this time the charge sharing occurs between the two upper capacities, connected to the nodes $V_{cU}(i-1)$ and $V_{cU}(i)$.

It is to be noted that during the two semi-periods in which the nodes $P_{gD}$, $P_{gU}$, $N_{gD}$, $N_{gU}$, go high or low, they always remain constant for the whole time of the sharing, and at such a voltage as to allow an efficient turn-on and turn-off of the pass transistors connected thereto, also when the supply voltage $V_{dd}$ is equal to 1V, as shown in FIG. 3. In particular, FIG. 3 shows the semi-period in which the charge sharing occurs between the two bottom capacities, i.e., the capacities connected to the nodes $V_{cD}(i-1)$ and $V_{cD}(i)$.

The transistors $M_{p1}$, $M_{p2}$, $M_{n1}$, and $M_{n2}$ allow the capacities $C_b$ to update at the voltage they refer to and to recover that charge lost to drive the pass transistors.

To completely evaluate the characteristics of this circuit, we will evaluate the differences of potential between the various nodes. First, consider the voltage differences between the nodes of a generic stage j of the single charge pump latch circuit, as shown in FIG. 4 or equivalently of one of the charge pump stages of the circuit shown in FIG. 2.

Starting from the most intuitive condition, which is that of end sharing ("End Sharing" instant—FIG. 4), when the voltage difference between the nodes A and B is obviously void:

$$V_{AB_{End\_Sh}} = 0$$

During the sharing, the voltage at the node A has been reduced by $\Delta V$, being:

$$\Delta V = \frac{I_L T}{C}$$

while that at the node B increases by the same amount, thus at the beginning of the sharing there occurs:

$$V_{AB_{Start\_Sh}} = 2\Delta V$$

But going back to the end sharing instant, at this point the phases switch ("Start No Sharing" instant) and, in consequence, the voltage at the node A decreases by a value equal to the supply voltage Vdd, while that at the node B increases by the same amount. This implies:

$$V_{AB_{Start\_NoSh}} = 2Vdd$$

During this semi-period there is no sharing in the stage j, while it is present in the adjacent stages, thus the capacity at the node A receives charge from that of the previous stage and the capacity at the node B transfer charge to that of the successive stage. At the end of the semi-period ("End No Sharing" instant) the voltage at the node A has increased by $\Delta V$ while that at the node B has been reduced by $\Delta V$, thus there occurs:

$$V_{AB_{Endt\_NoSh}} = 2Vdd - 2\Delta V$$

The results so far obtained are summarized in the following table.

TABLE 1

| | |
|---|---|
| $V_{AB_{End\_Sh}} = 0$ | End sharing between A and B |
| $V_{AB_{Start\_NoSh}} = 2Vdd$ | Start no sharing between A and B |
| $V_{AB_{Endt\_NoSh}} = 2Vdd - 2\Delta V$ | End no sharing between A and B |
| $V_{AB_{Start\_Sh}} = 2\Delta V$ | Start sharing between A and B |

Now we will reconsider a double charge pump circuit, making reference to the schemes of FIGS. 5 and 6. In particular, the circuit comprises two upper nodes A and B and two lower nodes C and D whereto respective capacities are connected. It is verified that the potential differences between the nodes during the operation are the following ones.

1) under the Start Sharing Up and Start No Sharing Down conditions of FIG. 5:

$$V_{BA}=2\Delta V; V_{CA}=Vdd+\Delta V; V_{CD}=2Vdd; V_{DB}=-(Vdd+\Delta V)$$

2) under the End Sharing Up and End No Sharing Down conditions of FIG. 6:

$$V_{BA}=0; V_{CA}=Vdd-\Delta V; V_{CD}=2Vdd-2\Delta V; V_{DB}=-(Vdd-\Delta V)$$

Considering then the circuit complete with the switches as shown in FIG. 2, the absolute values of the voltages at the nodes at the end of the semi-period in which the charge sharing has occurred between the two bottom capacities are summarized in the following table.

TABLE 2

| | |
|---|---|
| $V_{CUi-1}$ | $V_i - V_{dd} + \Delta V$ |
| $V_{CDi-1}$ | $V_i$ |
| $V_{CUi}$ | $V_i + V_{dd} - \Delta V$ |
| $V_{CDi}$ | $V_i$ |
| PgD | $V_i - V_{dd}$ |
| PgU | $V_i$ |
| NgD | $V_i + V_{dd}$ |
| NgU | $V_i$ |

Therefore, observing the differences of potential, the two pass transistors MpD and MnD on the bottom of FIG. 2 are on while those MpU and MnU on the top are off. Given the difficulty of obtaining perfectly crossed phases of the charge pump circuit, they are preferably realized overlapped or disoverlapped. In fact, when the phases are overlapped (i.e., when both FX and FN are equal to Vdd), the values of the voltages at the nodes become the following.

TABLE 3

| | |
|---|---|
| $V_{CUi-1}$ | $V_i + \Delta V$ |
| $V_{CDi-1}$ | $V_i$ |
| $V_{CUi}$ | $V_i + V_{dd} - \Delta V$ |
| $V_{CDi}$ | $V_i + V_{dd}$ |
| PgD | $V_i$ |
| PgU | $V_i$ |
| NgD | $V_i + V_{dd}$ |
| NgU | $V_i + V_{dd}$ |

It results that the pass transistor MpU is on, but also that the transistors Mn1 and Mn2 are on. In consequence, the capacities Cb which drive the N-channel MOS transistors are unloaded on the pumping capacity C and in a different way with respect to each other. This creates an asymmetry of the potentials at the nodes between the high part of the charge pump circuit and the low part during the charge sharing phases, as graphically shown in FIG. 7.

SUMMARY OF THE INVENTION

An object of the present invention is to overcome the limits of the known circuits, and to provide a charge pump latch circuit that is able to work correctly at very low supply voltages.

In embodiment of the present invention, the phases of the stabilization stage of the charge pump circuit are managed so as to turn off all four pass transistors during the overlapping of the phases themselves, so as to avoid asymmetries of potential during the charge sharing phases. In preferred embodiments of the present invention, the phases which drive portions of the stabilization stage connected to successive charge pump stages are inverted in a portion with respect to the other. Further, in one embodiment of the present invention, the phases are negated and suitably shifted to avoid any problem of stress on the thin oxide layers of the gate terminals of the transistors of the charge pump circuit during the charge sharing phases.

One embodiment of the present invention provides a charge pump latch circuit in which the stabilization stage is connected to at least one first and one second pair of first and second enable terminals receiving suitable and distinct phase signals able to ensure the turn-off of the stabilization stage during the overlapping periods of the phase signals.

Another embodiment of the present invention provides a method for driving transistors in a first and a second charge pump stage by a stabilization stage connected to control terminals of the transistors and suitable to ensure the turn-off of this stabilization stage during the overlapping periods of the relative phase signals.

The characteristics and the advantages of circuits and methods according to the present invention will be apparent from the following description of an embodiment thereof given by way of indicative and non-limiting example with reference to the annexed drawings.

DETAILED DESCRIPTION OF PREFERRED EMBODIMENTS

Preferred embodiments of the present invention will be described in detail hereinbelow with reference to the attached drawings.

Figure 1:
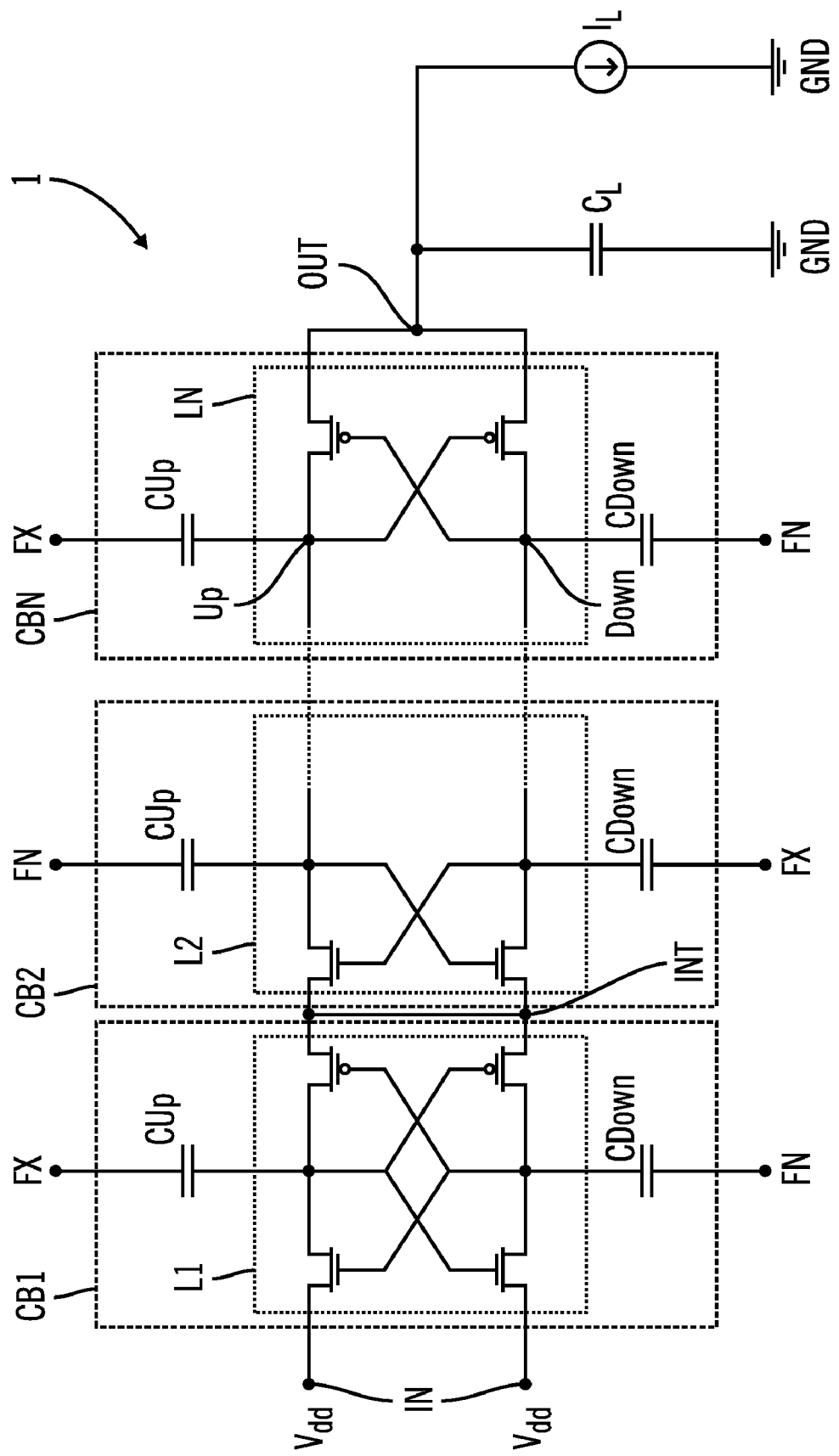
FIGS. 1 and 2 show a conventional charge pump circuit of the latch type.
Figure 2:
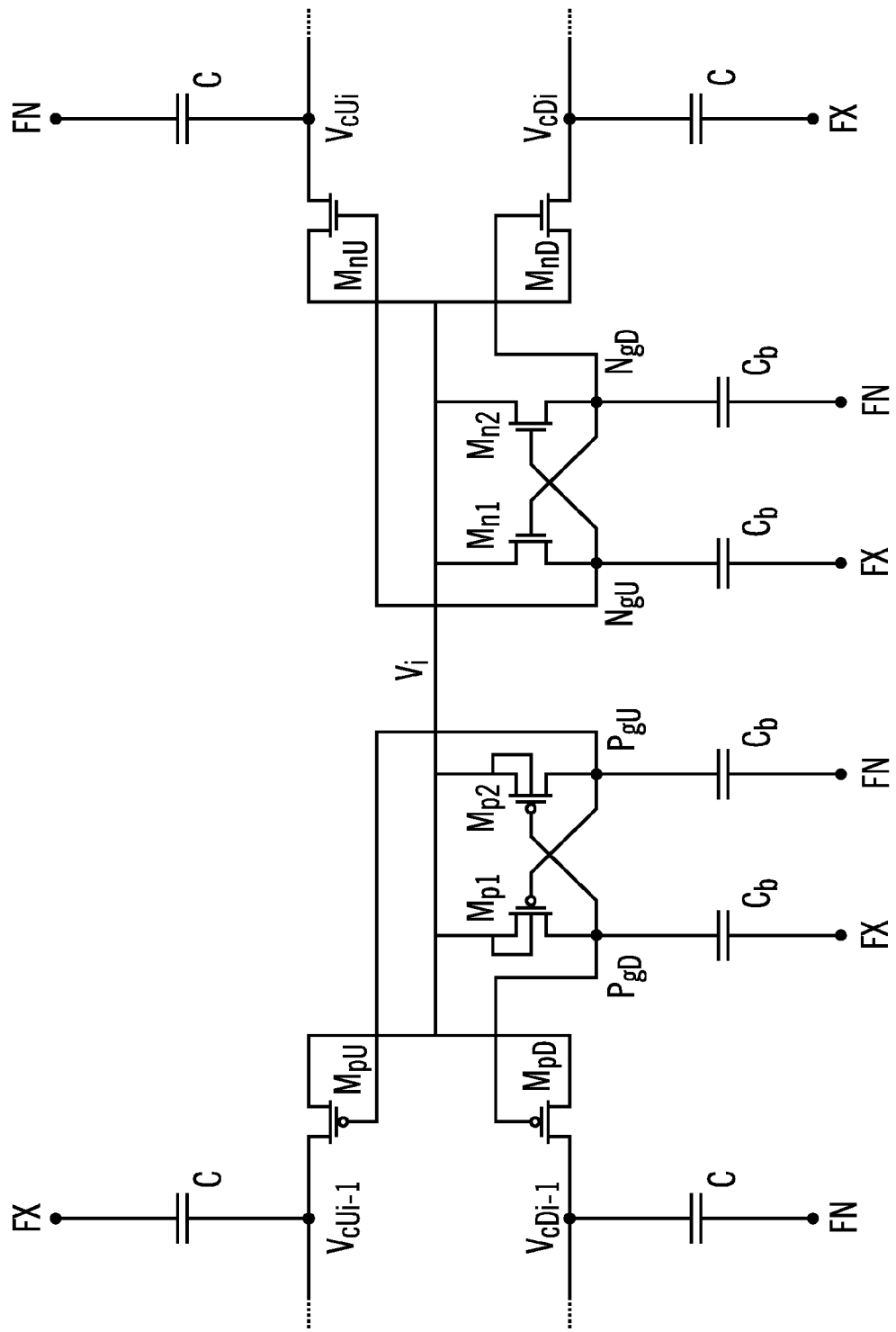
Figure 3:
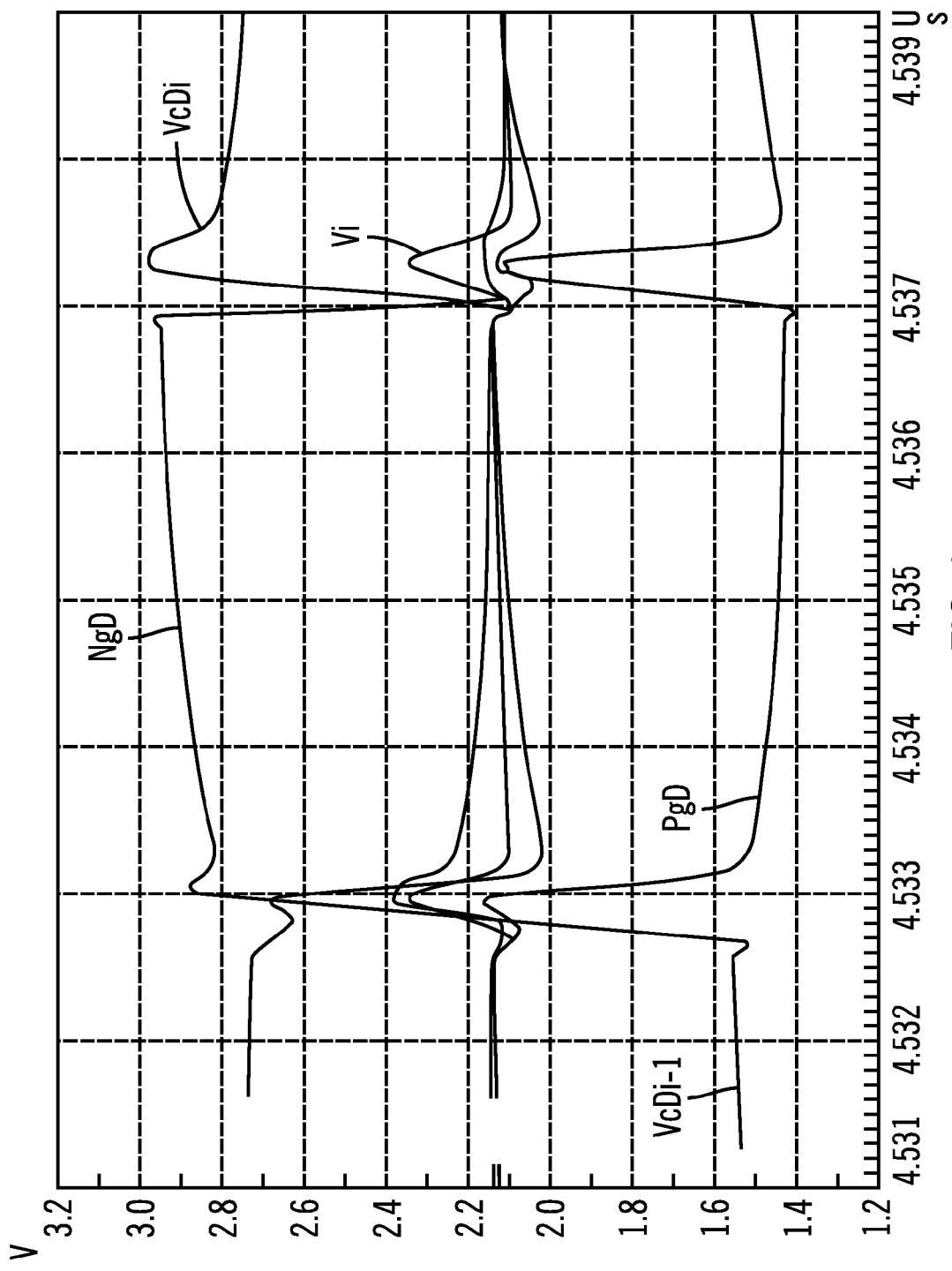
FIG. 3 shows the trend of inner signals of the charge pump circuit of FIG. 2.
Figure 4:
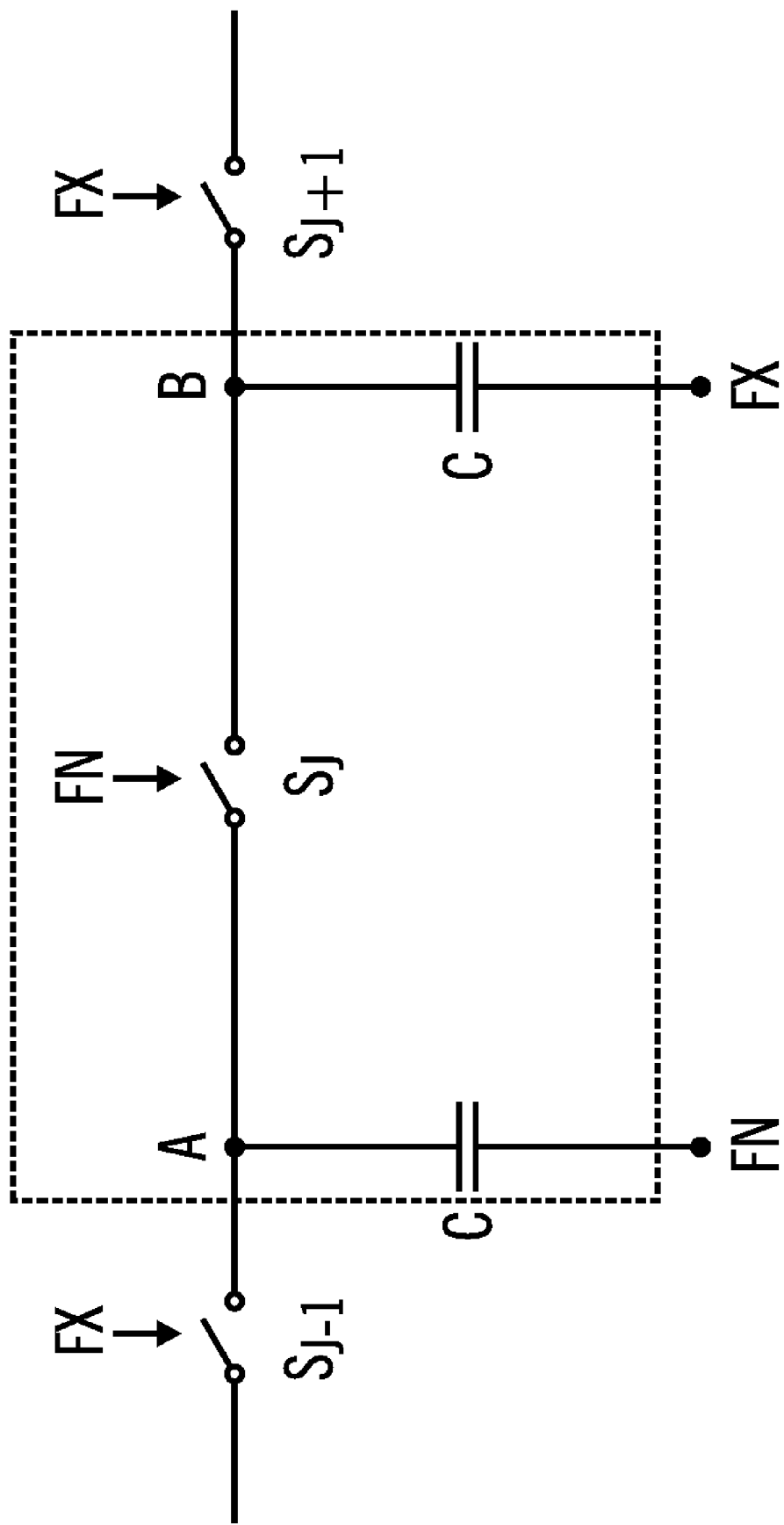
FIGS. 4, 5, and 6 show functional schematizations of the circuit of FIG. 2.
Figure 5:
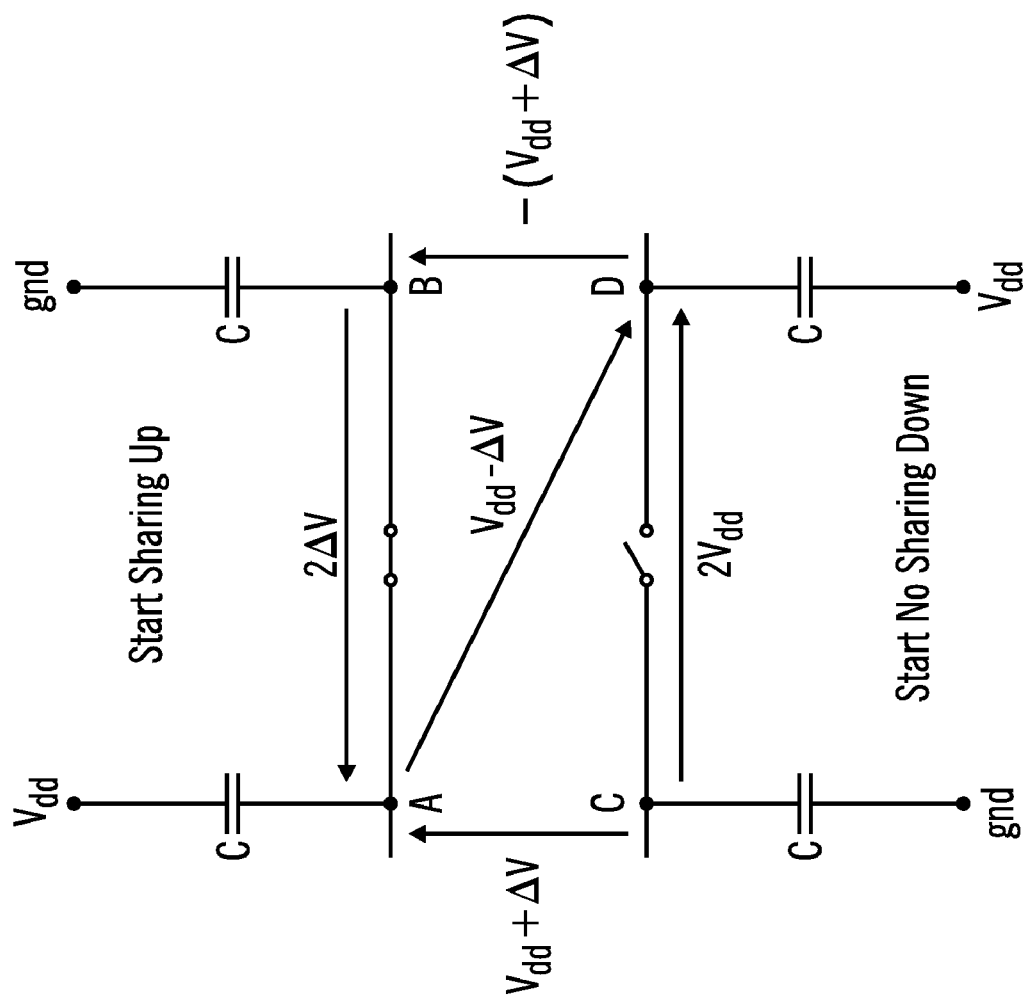
Figure 6:
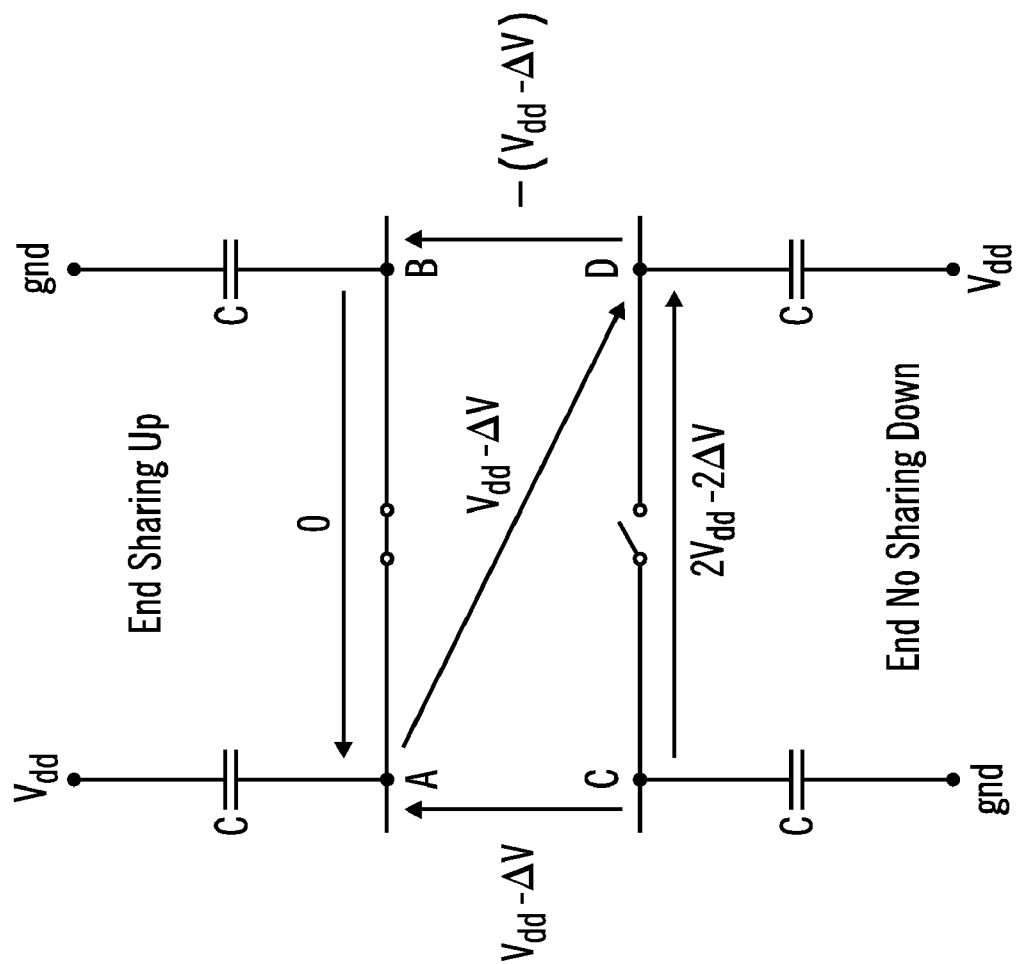
Figure 7:
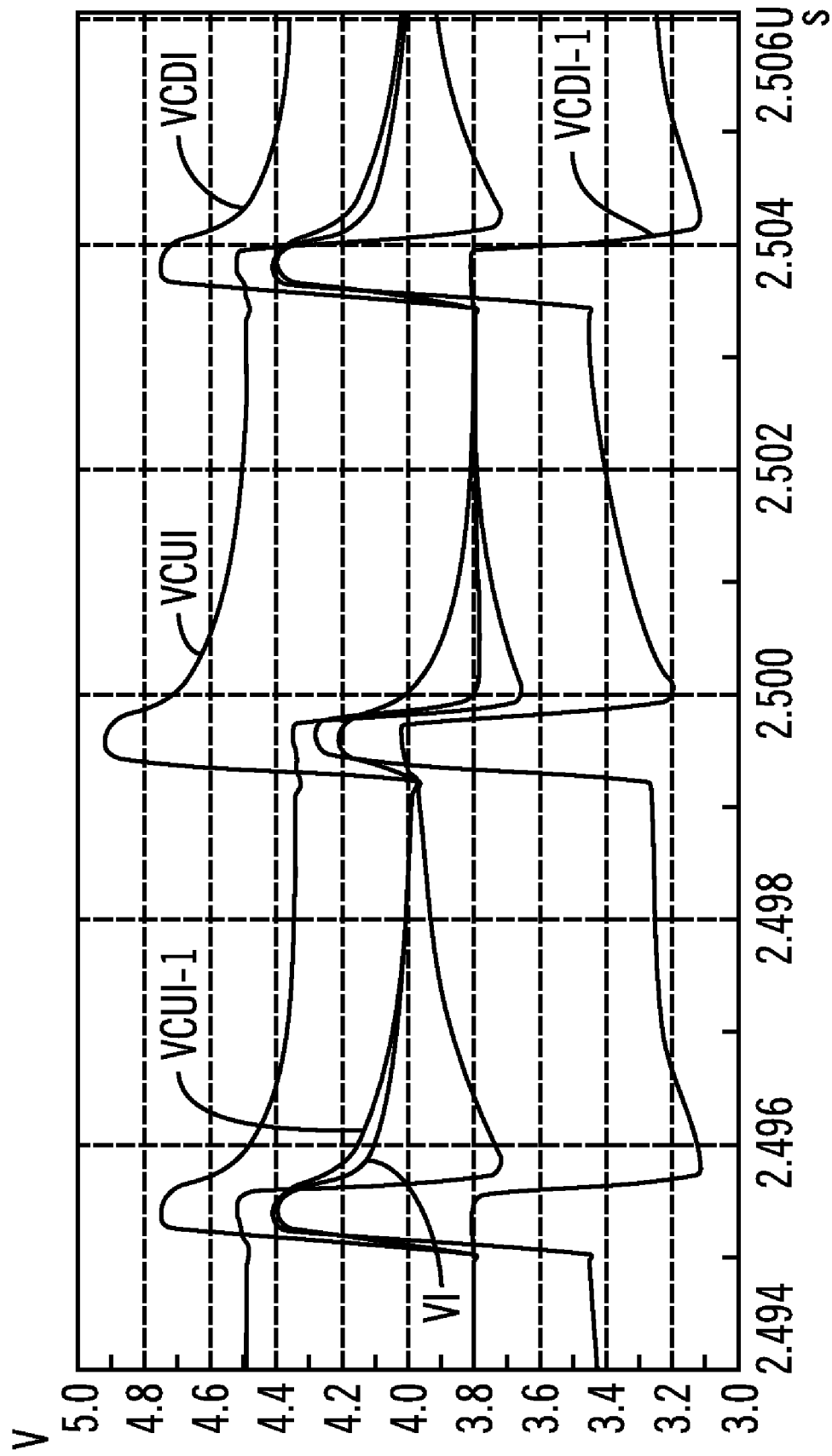
FIG. 7 shows the trend of inner signals of the circuit of FIG. 2.
Figure 8:
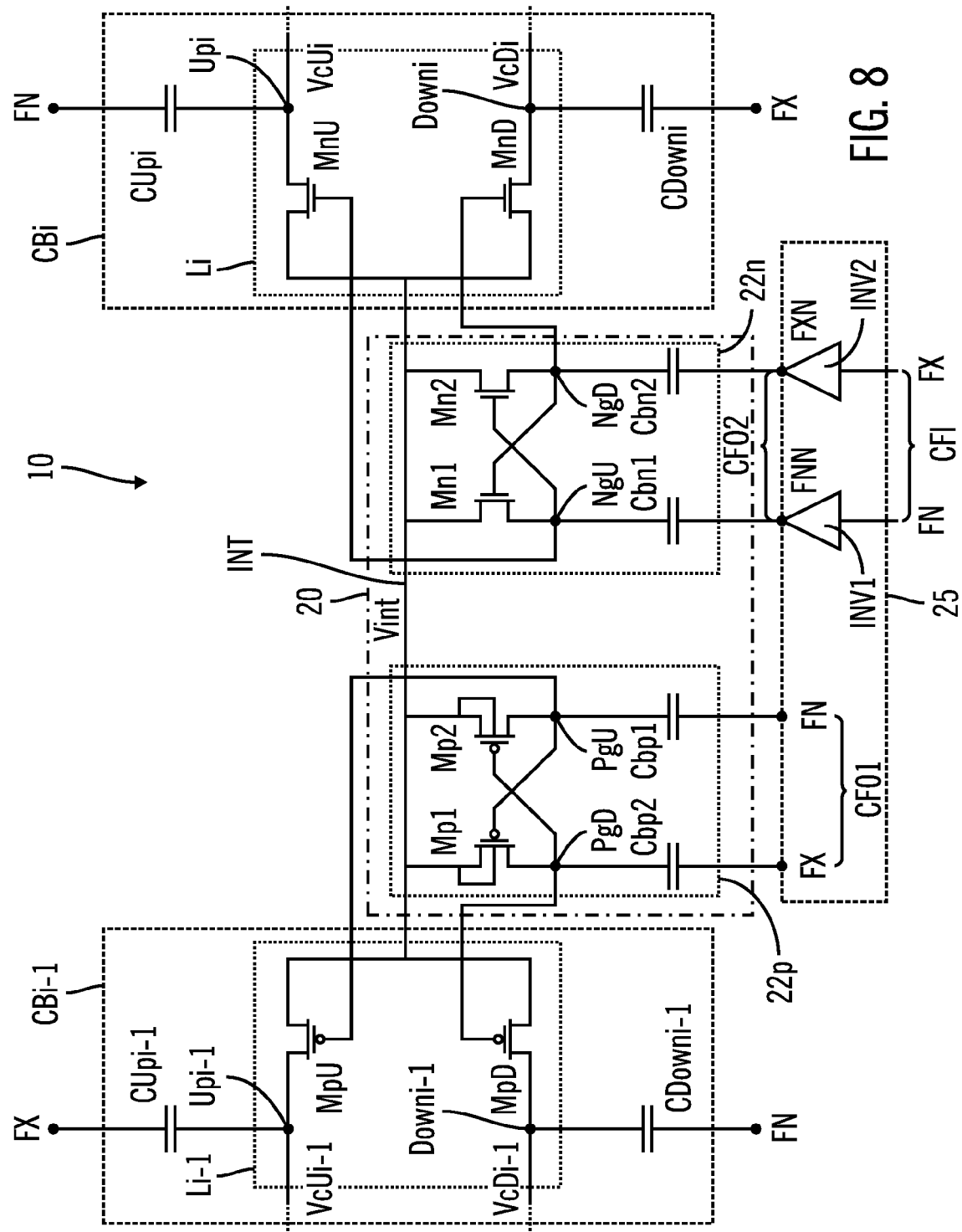
FIG. 8 shows a charge pump circuit according to one embodiment of the present invention.

FIG. 8 shows a charge pump circuit according to one embodiment of the present invention. The charge pump latch circuit 10 has at least two charge pump stages, with a generic charge pump stage being indicated as CBi.

The latch circuit 10 comprises several components which will be now described by identifying their belonging to functional blocks indicated inside dotted lines in FIG. 8.

A first stage CBi–1 can be defined as the input stage, even if in reality it can be considered a generic stage of the charge pump latch circuit 10.

This first stage CBi–1 comprises a first latch circuit Li–1, inserted between a first inner circuit node CUpi–1 and a second inner circuit node CDowni–1 and connected to an intermediate circuit node INT. The first latch circuit Li–1 comprises suitable transistors functioning as switch or pass transistors, in particular a first transistor MpU and a second transistor MpD, which in the embodiment shown are of the P-channel MOS type.

The successive or consecutive stage CBi comprises a second latch circuit Li, inserted between a third inner circuit node CUpi and a fourth inner circuit node CDowni and connected to the intermediate circuit node INT. The second latch circuit Li similarly comprises suitable transistors functioning as switch or pass transistors, in particular a third transistor MnU and a fourth transistor MnD, which in the embodiment shown are of the N-channel MOS type. This successive stage is also referred to as the second stage or output stage.

The charge pump latch circuit 10 also comprises a stabilization stage 20 connected to the intermediate circuit node INT. The stabilization stage 20 is also connected to at least one first pair CFO1 and one second pair CFO2 of first and second enable terminals receiving suitable phase signals and it is connected to control terminals or gates of the transistors of the latch circuits Lj inside the charge pump stages CBj.

In other words, the charge pump latch circuit 10 according to this embodiment of the present invention comprises a plurality of charge pump stages CBi inserted in series between first and second enable terminals receiving suitable phase signals FX and FN. Interconnected pairs, in particular consecutive pairs, of these charge pump stages, CBi–1 and CBi, are connected to an intermediate circuit node INT. The charge pump latch circuit 10 also comprises a stabilization stage 20 connected to the intermediate circuit node INT and to control terminals of transistors inside the charge pump stages CBi−1 and CBi.

The stabilization stage 20 is also connected to at least one first pair and one second pair of first and second enable terminals receiving suitable and distinct phase signals, to ensure the turn-off of the stabilization stage 20, in particular of all the transistors comprised therein (i.e., the transistors Mp1, Mp2, Mn1, and Mn2) during the overlapping periods of these phase signals.

In particular, the latch circuit 10 comprises a phase generator 25 suitable for supplying the stabilization stage 20 with these suitable and distinct phase values. The phase generator 25 has a pair of input terminals CFI receiving first and second input signals FA and FB, as well as a first pair CFO1 and a second pair CFO2 of output terminals respectively connected to the first and second pairs of enable terminals of the stabilization stage 20.

Suitably, the stabilization stage 20 comprises at least one first biasing portion 22$p$ and one second biasing portion 22$n$, respectively connected to the first and second charge pump stages CBi−1 and CBi, in particular to control terminals of transistors comprised therein, as well as to the first and second pair of output terminals CFO1 and CFO2 of the phase generator 25 for receiving therefrom the suitable and distinct phase signals, in particular the phases FX and FN and their negated values FXN and FNN.

The stabilization stage 20 comprises, in reality, a plurality of stabilization stages connected between pairs of consecutive charge pump stages, with a single stabilization stage being shown in FIG. 8 because it shows, for the sake of simplicity, only two charge pump stages CBi−1 and CBi.

Suitably, in each stabilization stage 20, the first biasing portion 22$p$ and the second biasing portion 22$n$ are connected to the transistors of the latch circuits Lj of the charge pump stages. In particular, the first biasing portion 22$p$ is connected to the first latch circuit Li−1 of the first stage or input stage CBi−1 and to the first pair CFO1 of enable terminals. Similarly, the second biasing portion 22$n$ is connected to the second latch circuit Li of the second stage or output stage CBi and to the second pair CFO2 of enable terminals.

In particular, the first biasing portion 22$p$ comprises: a first biasing capacitor Cbp1, inserted between a first control terminal PgU and a second enable terminal FN of the first pair CFO1 of enable terminals; a second biasing capacitor Cbp2, inserted between a second control terminal PgD and a first enable terminal FX of the first pair of enable terminals CFO1; a first control transistor Mp1, inserted between the intermediate circuit node INT and the first control terminal PgU and having a control terminal or gate connected to the second control terminal PgD; and a second control transistor Mp2, inserted between the intermediate circuit node INT and the second control terminal PgD and having a control terminal or gate connected to the first control terminal PgU.

In a similar way, the second biasing portion 22$n$ comprises: a third biasing capacitor Cbn1 inserted between a third control terminal NgU and a first enable terminal FXN of the second pair CFO2 of enable terminals; a fourth biasing capacitor Cbp2 inserted between a fourth control terminal NgD and a second enable terminal FNN of the second pair CFO2 of enable terminals; a third control transistor Mn1, inserted between the intermediate circuit node INT and the third control terminal NgU and having a control terminal or gate connected to the fourth control terminal NgD; and a fourth control transistor Mn2, inserted between the intermediate circuit node INT and the fourth control terminal NgD and having a control terminal or gate connected to the third control terminal NgU.

Suitably, the first and second control transistors Mp1 and Mp2 are of the same type as the first and second transistors MpU and MpD of the first latch circuit Li−1 of the first charge pump stage CBi−1 (i.e., they are P-channel MOS transistors in this embodiment), while the third and the fourth control transistors Mn1 and Mn2 are of the same type as the third and fourth transistors MnU and MnD of the second latch circuit Li of the second charge pump stage CBi (i.e., they are N-channel MOS transistors).

The voltage signal Vint at the intermediate circuit node INT remains constant and is used for correctly driving the turn-on and the turn-off of the latch transistors or pass transistors MpU, MpD, MnU, and MnP.

VcU and VcD indicate the voltage signals at the nodes Up and Down, respectively, of each charge pump stage CB. Moreover, also in this case the phases FX and FN, and FXN and FNN, are, at any time, complementary to each other.

It is possible to distinguish two different operative conditions equivalent to each other as follows.

1) FN=Vdd, FX=0 (FNN=0, FXN=Vdd), VcDi−1 is brought high and VcUi−1 is brought low, VcDi is low while VcUi is high. In this case, the node PgU is brought high (to a value equal to Vint) while the node PgD is brought low (in particular, by an amount equal to Vdd with respect to Vint), thus allowing the turn on of the transistor MpD and the turn off of the transistor MpU.

In the same semi-period, the node NgD is brought high (by an amount equal to Vdd with respect to Vint) and the node NgU is brought low. Then the transistor MnD is turned on, while the transistor MnU is turned off. In this way the charge sharing is obtained between the two adjacent pump capacitors connected to the terminals Downi−1 and Downi, while it is prevented between the two adjacent pump capacitors connected to the terminals Upi−1 and Upi.

2) FN=0, FX=Vdd (FNN=Vdd, FXN=0). In this case the charge pump latch circuit 10 operates in a similar although dual way with respect to the previous situation.

Advantageously in embodiments of the present invention, during the two semi-periods in which the nodes PgD, PgU, NgD, and NgU go high or low, they remain always constant for the whole time of the charge sharing, and at such a voltage as to allow an efficient turn-on and turn-off of the transistors in the latch circuits connected thereto.

To understand the operation of the charge pump latch circuit 10 according to this embodiment of the present invention, the start of a charge sharing step between the pump capacitors connected to the nodes Up of the charge pump stages is considered, thus with the first phase FX at Vdd and the second phase FN at zero.

In this period, the latch transistors connected to the nodes Up (i.e., the first transistor MpU and the third transistor MnU) should be well on while those connected to the nodes Down (i.e., the second transistor MpD and the fourth transistor MnD) should be well off so as not to favor any charge return.

The stabilization stage 20 of the charge pump latch circuit 10 generates potentials capable of driving in a very efficient way the control terminals of the latch transistors, also during the whole charge sharing period.

In fact, during this charge sharing period, the potentials thus obtained remain constant.

In particular, considering the above reported charge sharing condition of the capacitors connected to the nodes Up, it occurs that, at the beginning of the charge sharing period, when the phase FX is brought to Vdd, the node PgD, which was previously at Vint-Vdd, now increases and is brought to Vint. This value leads to the turn-off of the second latch transistor MpD as well as of the first control transistor Mp1.

With regard to the node PgU, in the previous period it was brought to Vint while now, since the phase FN has decreased to zero, it is brought to Vint-Vdd. This value leads to the turn-on of the first latch transistor MpU as well as of the second control transistor Mp2.

In substance, the control transistors, Mp1 and Mp2, respectively Mn1 and Mn2, in the stabilization stage 20, allow the respective biasing capacitors, Cbp1 and Cbp2, respectively Cbn1 and Cbn2, to update with respect to the voltage on the node they refer to and to recover the lost charge to correctly drive the latch transistors.

In this way, the charge pump latch circuit 10 according to this embodiment of the present invention correctly operates for supply voltages Vdd having a value next to the threshold voltage value of the transistors, in particular equal to 1V.

The output current-voltage characteristic of the charge pump latch circuit 10, due to the stabilization stage 20, remarkably improves with respect to the conventional solutions and follows a linear law.

However, the most delicate part of the circuit is represented by the difficulty found in the generation of the phases FX and FN so that they are perfectly crossed with each other.

It occurs, in fact, that these phases FX and FN are overlapped for an overlapped period $\Delta t$.

Thus, when the first phase FX is brought to a high value equal to the supply voltage Vdd, the charge sharing period of the pump capacitors connected to the nodes Up should start.

Unfortunately, due to the delay with which the second phase FN is brought to a low value, in particular to the ground potential, a correct charge sharing is not obtained since the transistors of the latch circuits of the charge pump stages during the overlapping period $\Delta t$ are not under correct conditions for the charge sharing and in particular they are all under turn-off conditions.

Under these conditions, there is no passage of charge from the pump capacitor CUpi−1 connected to the node Upi−1 to the pump capacitor CUpi connected to the node Upi, as desired, while from the pump capacitor CDowni connected to the node Downi and from the biasing capacitors, Cbn1 and Cbn2, connected to the nodes NgU and NgD, respectively, to the pump capacitor CUpi connected to the node Upi.

This pump capacitor CUpi thus receives more charge than the charge received by the pump capacitor CDowni connected to the node Downi in the successive period and thus this behavior leads to an asymmetry in the charge sharing.

This embodiment of the present invention also solves this potential drawback by using suitable and distinct phase signals, in particular of the phases FX and FN and of their negated values FXN and FNN applied to distinct pairs of enable terminals of the stabilization stage 20.

Due to this measure the negated phases FXN and FNN turn off all four switches (i.e., the control transistors Mp1, Mp2, Mn1, and Mn2) during the overlapping period.

In particular, the latch circuit 10 thus comprises the phase generator 25.

In a first embodiment of the latch circuit 10 according to the present invention, the phase generator 25 essentially comprises a first logic inverter INV1 and a second logic inverter INV2 connected to the pair of input terminals CFI which already receive the phases FX and FN. These inverters INV1 and INV2 are also connected to the second pair CFO2 of enable terminals to supply to them the negated phases FXN and FNN, while the first pair CFO1 of enable terminals is simply connected directly to the pair of input terminals CFI for receiving the phases FX and FN.

In the embodiment shown in FIG. 8, these inverters INV1 and INV2 are thus placed upstream of the biasing capacitors Cbn1 and Cbn2 of the second portion 22n of the stabilization stage 20.

In particular, the third biasing capacitor Cbn1 is connected, through the first inverter INV1, to the first enable terminal FN and receives the signal FNN complementary to the first phase FN.

The fourth biasing capacitor Cbn2 is connected, through the second inverter INV2, to the first enable terminal FX and receives the signal FXN complementary to the first phase FX.

In this way, the third and fourth control transistors Mn1 and Mn2, suitably driven by the complementary values FNN and FXN of the phases FX and FN, remain off during the overlapping period $\Delta t$, thus forcing under the turning-off condition also the fourth latch transistor MnD.

In this way, a correct charge sharing is ensured, also if the turn-on of the first and third latch transistor MpU and MnU only occurs after the end of the overlapping period $\Delta t$ thus reducing the sharing period, without however introducing particular drawbacks for the operation of the charge pump latch circuit 10.

The circuit configuration of FIG. 8 also solves possible problems linked to the disoverlapping case.

In fact, it is verified that the situation previously indicated with reference to the phases in overlapping is proposed again also in case of disoverlapping of the phases FX and FN, although this situation can interest only the control transistors Mp1 and Mp2 of the first portion 22p of the stabilization stage 20.

Simulations carried out on the charge pump latch circuit 10 shown in FIG. 8 clarify how each asymmetry problem in the charge sharing is solved.

The control terminals of the transistors contained in the charge pump latch circuit 10 are correctly biased for the whole duration of the semi-periods in which the charge sharings occur. This allows the sizes of the charge pump stages to be reduced so as to meet the specifications, and in fact it allows sizing according to the mathematical law characterizing its typical behavior.

During the overlapping of the phases (i.e., when FX=FN=VDD), the transistors Mn1 and Mn2 are off and prevent the two capacities Cbn1 and Cbn2 connected thereto from losing charge. Moreover, to turn on and off the pass transistors it is enough to supply their gates with such a biasing voltage as the gate-source voltage in absolute value $|Vgs|$ is smaller at the beginning of the semi-period and maximum immediately after.

In substance, the phase generator 25 of the charge pump latch circuit 10 according to this embodiment of the present invention allows there to be obtained suitable and distinct phase signals to be applied to the first and second pairs of enable terminals CFO1 and CFO2 of the stabilization stage 20 to turn off all control transistors comprised therein prior to the charge sharing step.

Figure 10:
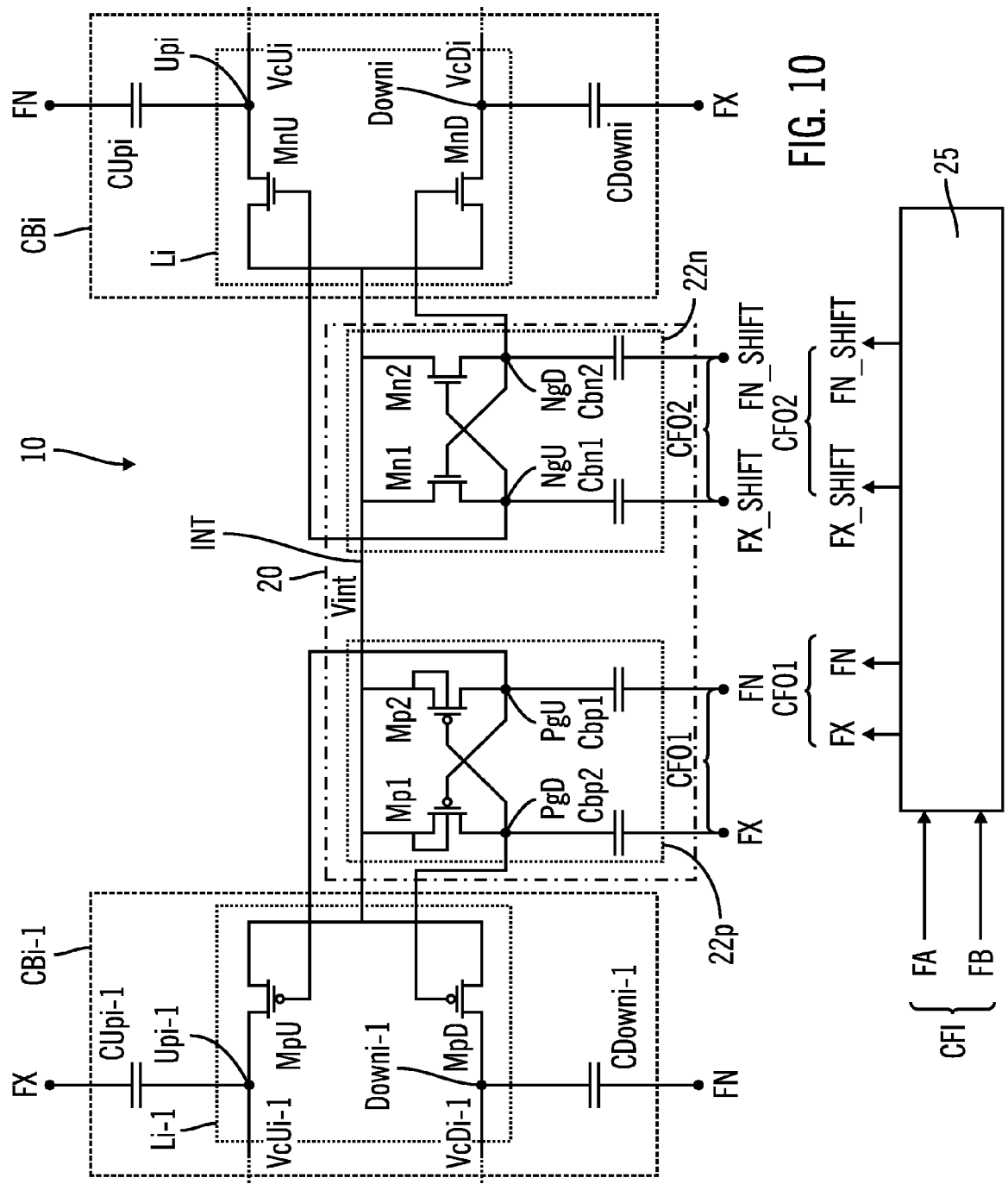
FIG. 10 shows a charge pump circuit according to another embodiment of the present invention.

FIG. 10 shows a charge pump latch circuit 10 according to another embodiment of the present invention.

According to this alternative embodiment, the charge pump latch circuit 10 receives in correspondence with the second pair CFO2 of enable terminals shifted phases FX_SHIFT and FN_SHIFT negated and suitable level shifted with respect to the phases FX and FN supplied on the first pair CFO1 of enable terminals, with these suitably shifted phases being generated by the phase generator 25 starting from suitable input signals FA and FB.

In fact, a simple inversion of the phases FX and FN by the phase generator 25 in the charge pump latch circuit of FIG. 8 both eliminates the problem of the potential asymmetries in the charge sharing periods, and introduces a potential stress problem on the oxides of the low voltage pass transistors during these charge sharing periods.

In fact, in the charge pump latch circuit shown in FIG. 8 for a cycle in which the first phase FX is low (FX=0) and the second phase FN is high (FN=Vdd), it occurs that:

$$VcUi=(Vi-\Delta V+Vdd); VcUi-1=(Vi-Vdd+\Delta V)$$

When the phase overlapping occurs (with FX high and FN high) all the pass transistors of the charge pump latch circuit 10 result—as desired—off and it occurs that:

$$VcUi=(Vi-\Delta V+Vdd); VcUi-1=(Vi+\Delta V)$$

Figure 9:
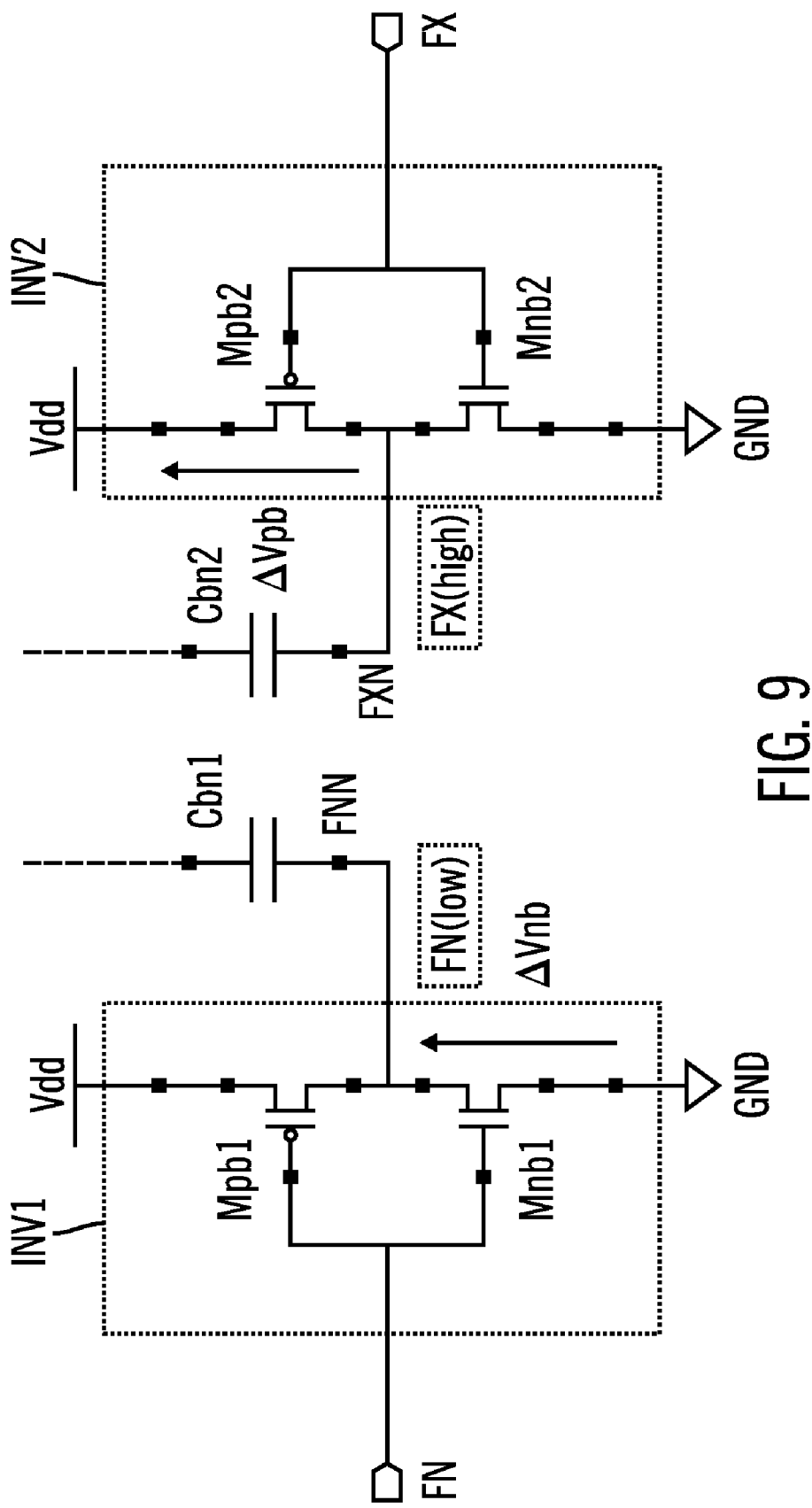
FIG. 9 shows in greater detail a part of the circuit of FIG. 8 during a charge sharing phase.

Subsequently, the second phase FN is brought low and the charge sharing step starts. In this time range, as shown in FIG. 9, it occurs that the inverters INV1 and INV2 which generate the negated phases FXN and FNN supply a lot of current in the initial part of this charge sharing. In particular, these inverters INV1 and INV2 comprise respective first and second MOS transistors. The first inverter INV1 comprises a first P-channel MOS transistor Mpb1 and a second N-channel MOS transistor Mnb1 inserted in series between the supply reference Vdd and the ground GND and having gate terminals connected to each other and receiving the second phase FN, as well as an intermediate circuit node suitable for realizing the output terminal of the inverter and for supplying the biasing capacitor Cbn1 connected thereto with the second negated phase FNN. Similarly, the second inverter INV2 comprises a first P-channel MOS transistor Mpb2 and a second N-channel MOS transistor Mnb2 inserted in series between the supply reference Vdd and the ground GND and having gate terminals connected to each other and receiving the first phase FX, as well as an intermediate circuit node suitable for realizing the output terminal of the inverter and for supplying the biasing capacitor Cbn2 connected thereto with the first negated phase FXN.

In consequence, a resistive drop on the transistors Mnb1-Mnb2 and Mpb1-Mpb2 in these inverters INV1 and INV2 limits the voltage on the gate terminals of the pass transistors that are P-channel (in this case the pass transistor MpU in FIG. 8).

It thus occurs that, in the initial phase of the charge sharing, the voltage between the node VcUi−1 (corresponding to the source terminal of the pass transistor MpU) and the node PgU (corresponding to the gate terminal of the pass transistor MpU) is given by:

$$Vsg=(Vi+\Delta V)-(Vi-Vdd)-\Delta Vnb-\Delta Vpb=\Delta V+Vdd-(\Delta Vnb+\Delta Vpb)$$

$\Delta Vnb$ and $\Delta Vpb$ being the voltage drops on the transistors with N-channel and with P-channel, respectively, of the inverters INV1 and INV2. In particular, in the case shown in FIG. 9 where the second phase FN is low and the first phase FX is high, EVnb is the drop of potential across the transistor Mnb1 of the first inverter INV1 and EVpb is the drop of potential across the transistor Mnp2 of the second inverter INV2.

In other words, the overall voltage drop $\Delta Vnb+\Delta Vpb$ limits the source-gate voltage Vsg of the pass transistor that is P-channel MpU. In fact in the absence of the transistors of the inverters INV1 and INV2 the source-gate voltage value of this transistor MpU would be greater than the supply voltage value and equal to $Vsg=(Vdd+\Delta V)$.

This mechanism does not act however on the pass transistor that is N-channel MnU for which the source-gate voltage Vsg is equal to $\Delta V+Vdd-\Delta Vnb$.

It then occurs that the initial voltage on the gate terminal of this pass transistor that is N-channel MnU is higher than that on the gate terminal of the pass transistor that is P-channel MpU, with subsequent risk of breakage of the gate terminal (in particular of the gate oxide layer) of the pass transistor that is N-channel MnU.

In this alternative embodiment of the present invention shown in FIG. 10, the phase generator 25 supplies the stabilization stage 20 with shifted phases FX_SHIFT and FN_SHIFT negated and suitably level shifted with respect to the phases FX and FN supplied to the first pair CFO1 of enable terminals.

In particular, to overcome the above indicated drawbacks, the shifted phases FX_SHIFT and FN_SHIFT are overlapped to offer such a transient resistive drop as to protect against overvoltages (i.e., against voltages higher than the maximum value given by the value of the supply voltage Vdd) at the gate terminals of the pass transistor of the charge pump latch circuit 10.

For this specific purpose the alternative embodiment shown in FIG. 10 uses respective digital level shifter circuits 30 and 40 which allow there to be applied to the second pair of enable terminals of the stabilization stage 20 respective shifted phase signals FX_SHIFT and FN_SHIFT negated and level shifted.

Figure 11:
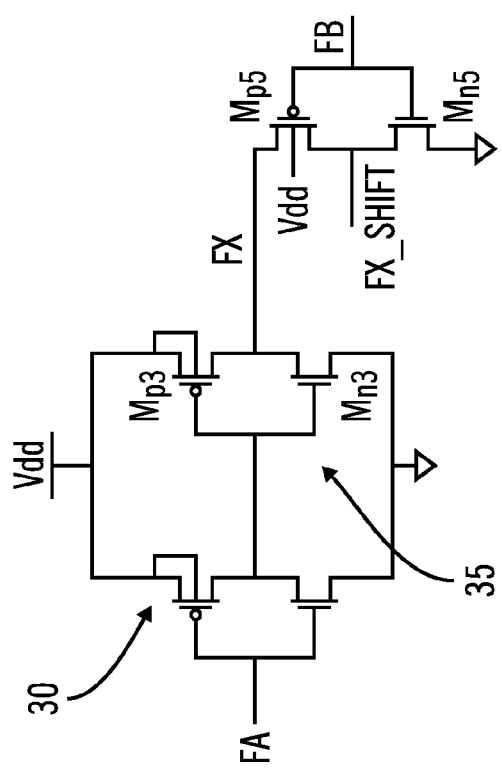
FIGS. 11 and 12 show views of phase generator circuits used in the circuit of FIG. 10.
Figure 12:
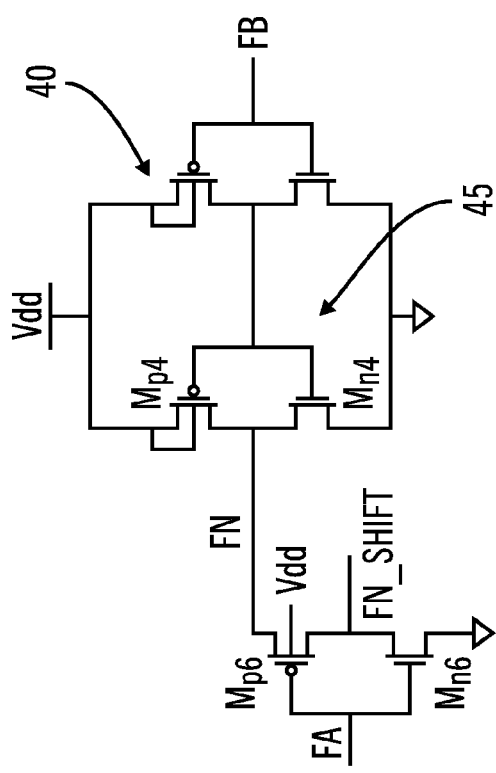

The circuit 30 is shown in FIG. 11, while the circuit 40 is shown in FIG. 12. In particular, the circuits 30 and 40 are small and quick level shifters driven at very low voltages (~1V), suitable for example to be within consumption specifications in the Standby mode.

The circuit 30 comprises a first input circuit portion 35 with transistors inserted between the supply reference Vdd and the ground GND in which an output stage with a complementary pair of transistors Mp3 and Mn3 produces the first phase signal FX starting from a first input signal FA. This first phase signal FX is applied to a conduction terminal of an output circuit portion comprising a further complementary pair of transistors Mp5 and Mn5 which receive on their own common control terminals a second input signal FB.

The body terminal of the pull-up transistor Mp5 of the further complementary pair of transistors Mp5 and Mn5 is biased at the value of the supply voltage Vdd.

At the output of the further complementary pair of transistors Mp5 and Mn5 the first shifted phase signal FX_SHIFT is generated, negated and suitably level shifted with respect to the first phase signal FX.

Similarly, the circuit 40 comprises a first input circuit portion 45 with transistors inserted between the supply reference Vdd and the ground GND in which an output stage with a complementary pair of transistors Mp4 and Mn4 produces the second phase signal FN starting from the second input signal FB. This second phase signal FN is applied to a conduction terminal of an output circuit portion comprising a further complementary pair of transistors Mp6 and Mn6 which receive on their own common control terminals the first input signal FA.

The body terminal of the pull-up transistor Mp6 of the further complementary pair of transistors Mp6 and Mn6 is biased at the supply voltage value Vdd.

At the output of the further complementary pair of transistors Mp6 and Mn6 the second shifted phase signal FN_SHIFT is generated, negated and suitably level shifted with respect to the second phase signal FN.

Figure 13A:
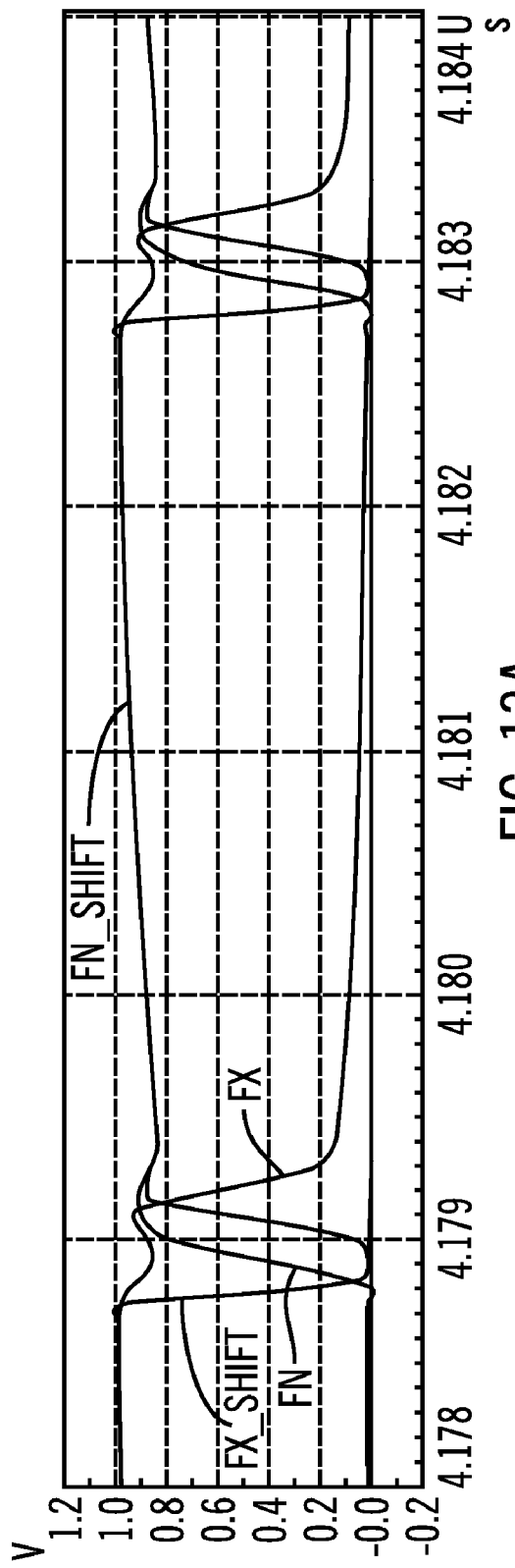
FIG. 13A shows the trend of signals applied to the circuit of FIG. 10.
Figure 13B:
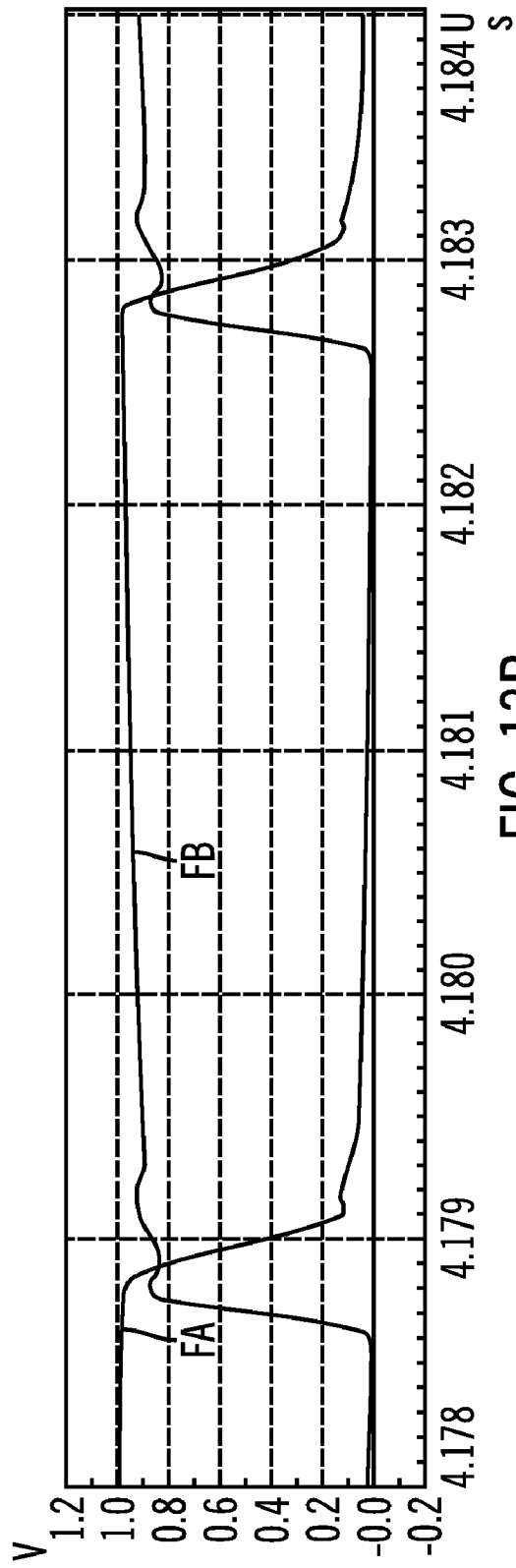
FIG. 13B shows the trend of signals applied at the input of the circuits of FIGS. 11 and 12.

The trend of the input signals FA and FB is shown in FIG. 13B, while FIG. 13A shows the trend of the phase signals FX and FX and of the shifted phase signals FX_SHIFT and FN_SHIFT.

Going back to the charge pump latch circuit of FIG. 10, during the previously analyzed overlapping phase the two phases FX and FN are high (Vdd) and in consequence the PMOS switches are off while the shifted phases FX_SHIFT and FN_SHIFT are low (GND) and the two NMOS switches are off, exactly as desired.

Moreover, by sizing the PMOS transistors Mp3 and Mp4 and Mp5 and Mp6 of the circuits 30 and 40, and also the NMOS transistors Mn3 and Mn4 in a suitable way, the voltage drop thereon can be exploited to obtain the effect of turning on and off more slowly the switches of the stabilization stage 20 and avoiding stresses on the oxides of the pass transistors of the charge pump latch circuits 10.

In this way it is possible to obtain a smaller |Vgs| at the beginning of the charge sharing semi-period and a greater one during the charge sharing until the end of the semi-period.

Figure 14:
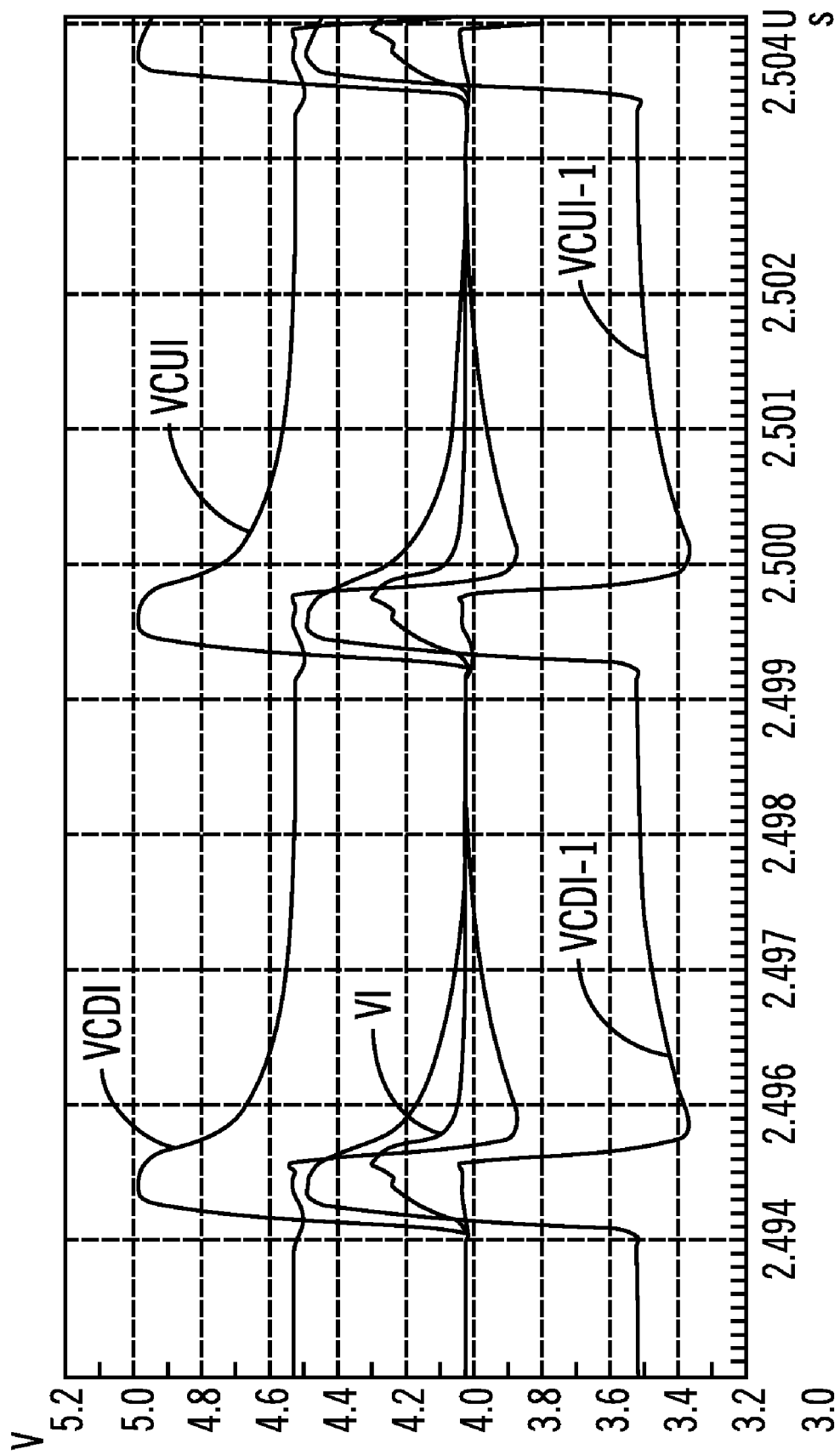
FIG. 14 shows the trend of inner signals of the circuit of FIG. 10.

This situation is shown by the trend of the signals reported in FIG. 14.

In a real circuit the well known body effect is to be taken into account, with this effect tending to increase the threshold voltage of the transistors, reducing the potentialities of the charge pump circuit.

Moreover, considering that PMOS transistors have been used as pass transistors for the charge sharing between the charge pump stages CBi, in particular the transistors MpU and MpD, the so-called latchup phenomenon is also to be taken into account, being triggered by the parasite transistors due to the junctions pnpn contained in the CMOS structures like the latch circuits Li.

These measures are however well known and one of ordinary skill in the art can balance the circuits 10, 30, and 40 according to the needs of a particular application.

Advantageously, the charge pump latch circuit according to the present invention shows the following fundamental advantages.

It does not suffer from asymmetries since the phase signals FX and FN and their negated values FXN and FNN turn off all the pass transistors prior to the charge sharing.

It allows there to be protected the gate terminals (in particular the thin oxide layers) of the low voltage (LV) transistors thanks to the generation of negated and suitably shifted phases (FX_SHIFT, FN_SHIFT) which avoid, by virtue of the resistive drops on the output terminals of the level shifter circuits which generate these phases, during the transients of the charge sharing phases, the overvoltages which would otherwise damage these LV transistors.

The present invention also provides a method for driving transistors in first and second charge pump stages CBi−1 and CBi, which are interconnected by an intermediate circuit node INT, by a stabilization stage 20 connected to control terminals of these transistors. The method comprises a generation step, by the stabilization stage 20, of at least one first pair of phase signals and a second pair of phase signals, and a step of applying to a first pair and a second pair of enable terminals CFO1 and CFO2 of the stabilization stage 20 the first and second pair of phase signals to ensure the turn-off of the stabilization stage 20 itself during the overlapping periods of these phase signals.

This step of generating pairs of phase signals allows there to be obtained the second pair of phase signals FXN and FNN negated with respect to the first pair of phase signals FX and FN.

Alternatively, this step of generating pairs of phase signals allows there to be obtained the second pair of phase signals FXN_SHIFT and FNN_SHIFT negated and suitably level shifted with respect to the first pair of phase signals FX and FN.

The present invention remarkably improves the functionality of the charge pump latch circuits due to the different way of generating the phases. In this way, any possible bad operation due to the charge sharing of the capacities Cb with the pumping capacity is prevented.

Moreover, by suitably sizing the circuits 30 and 40, generators of the phases, the voltage drop on the transistors can be used for allowing the switches to switch more slowly.

The present invention is particularly suited for supplies lower than 1 volt.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A charge pump latch circuit comprising:
   at least one first charge pump stage and at least one second charge pump stage interconnected by an intermediate circuit node, the first charge pump stage comprising at least a first transistor, and the second charge pump stage comprising at least a second transistor;
   a stabilization stage connected to the intermediate circuit node, to a control terminal of the first transistor of the first charge pump stage, and to a control terminal of the second transistor of the second charge pump stage, the stabilization stage including at least one first pair of first and second enable terminals and at least one second pair of first and second enable terminals; and
   a phase generator that includes at least one pair of input terminals receiving first and second input signals, a first pair of output terminals connected to the first pair of enable terminals of the stabilization stage to supply the first pair of enable terminals with first and second distinct phase signals, and a second pair of output terminals connected to the second pair of enable terminals of the stabilization stage,
   wherein the phase generator further includes digital level shifter circuits connected to the second pair of output terminals of the phase generator, the digital level shifter circuits shifting the levels of the first and second distinct phase signals so as to supply the second pair of enable terminals of the stabilization stage with first and second shifted phase signals that are negated and suitably level shifted with respect to the first and second distinct phase signals supplied to the first pair of enable terminals of the stabilization stage, and
   the digital level shifter circuits each comprise an output circuit portion comprising a transistor having a control terminal that receives one of the first and second input signals, a first terminal that receives one of the first and second distinct phase signals, and a second terminal that supplies one of the first and second shifted phase signals that is negated and suitably level shifted with respect to the one distinct phase signal.

2. The charge pump latch circuit according to claim 1, wherein the stabilization stage further includes:
   at least one first biasing portion connected to the first charge pump stage and to the first pair of output terminals of the phase generator; and
   at least one second biasing portion connected to the second charge pump stage and to the second pair of output terminals of the phase generator.

3. The charge pump latch circuit according to claim 2, wherein each charge pump stage comprises:
   a first pump capacitor coupled between one enable terminal and a first inner circuit node;
   a second pump capacitor coupled between another enable terminal and a second inner circuit node;
   a first latch transistor coupled between the first inner circuit node and the intermediate circuit node; and
   a second latch transistor coupled between the second inner circuit node and the intermediate circuit node, the enable terminals of the charge pump stage receiving phase signals that are complementary to each other,
   wherein the first biasing portion is connected to control terminals of the first and second latch transistors of the first charge pump stage, and to the first pair of enable terminals of the stabilization stage, and
   the second biasing portion is connected to control terminals of the first and second latch transistors of the second charge pump stage, and to the second pair of enable terminals of the stabilization stage.

4. The charge pump latch circuit according to claim 3, wherein the first and second biasing portions each comprise:
   a first biasing capacitor coupled between the control terminal of the first latch transistor of one of the charge pump stages and the second enable terminal of one of the pairs of enable terminals; and
   a second biasing capacitor coupled between the control terminal of the second latch transistor of the one charge pump stage and the first enable terminal of the one pair of enable terminals.

5. The charge pump latch circuit according to claim 4, wherein the first and second biasing portions each further comprise:
   a first control transistor coupled between the intermediate circuit node and the control terminal of the first latch transistor of the one charge pump stage, a control terminal of the first control transistor being connected to the control terminal of the second latch transistor of the one charge pump stage; and
   a second control transistor coupled between the intermediate circuit node and the control terminal of the second latch transistor of the one charge pump stage, a control terminal of the second control transistor being connected to the control terminal of the first latch transistor of the one charge pump stage.

6. The charge pump latch circuit according to claim 1, wherein the charge pump latch circuit comprises a plurality of first charge pump stages and a plurality of second charge pump stages, and
   the stabilization stage comprises a plurality of stabilization stages, each of the stabilization stages being coupled between a pair of one first charge pump stage and one second charge pump stage that are interconnected.

7. The charge pump latch circuit according to claim 1, wherein the first and second shifted phase signals are overlapped to provide a transient resistive drop that protects against overvoltages at a gate terminal of the second transistor.

8. The charge pump latch circuit according to claim 1, wherein a body terminal of the transistor of the output circuit portion of the digital level shifter circuit is biased at a value of the supply voltage.

9. The charge pump latch circuit according to claim 1, wherein the digital level shifter circuits each further comprise an input circuit portion that receives the other of the of the first and second input signals and supplies the one distinct phase signal to the output circuit portion of the digital level shifter circuit.

10. The charge pump latch circuit according to claim 9, wherein the input circuit portion comprises at least two pairs of complimentary transistors connected between a supply reference and ground.

11. The charge pump latch circuit according to claim 1, wherein the transistor of the output circuit portion of the digital level shifter circuit is sized so as to slow the turning on and off of switches of the stabilization stage.

12. A latch-type charge pump circuit including at least one first charge pump stage coupled to at least one second charge pump stage by an intermediate circuit node, the charge pump circuit comprising:
   a first pump capacitor coupled between a first enable terminal and a first inner circuit node;
   a second pump capacitor coupled between a second enable terminal and a second inner circuit node, the first and second enable terminals receiving phase signals that are complementary to one another;
   a third pump capacitor coupled between the second enable terminal and a third inner circuit node;
   a fourth pump capacitor coupled between the first enable terminal and a fourth inner circuit node;
   a first latch transistor coupled between the first inner circuit node and the intermediate circuit node;
   a second latch transistor coupled between the second inner circuit node and the intermediate circuit node;
   a third latch transistor coupled between the third inner circuit node and the intermediate circuit node;
   a fourth latch transistor coupled between the fourth inner circuit node and the intermediate circuit node;
   a stabilization circuit including at least one stabilization stage coupled to the intermediate circuit node, the at least one stabilization stage being coupled to control terminals of the first, second, third, and fourth latch transistors for supplying these latch transistors with suitable control signals so as to ensure correct turn-on and turn-off during a charge sharing period of the charge pump circuit; and
   a phase generator that includes at least one pair of input terminals receiving first and second input signals, a first pair of output terminals connected to a first pair of enable terminals of the stabilization stage to supply the first pair of enable terminals with first and second distinct phase signals, and a second pair of output terminals connected to a second pair of enable terminals of the stabilization stage,
   wherein the phase generator further includes digital level shifter circuits connected to the second pair of output terminals of the phase generator, the digital level shifter circuits shifting the levels of the first and second distinct phase signals so as to supply the second pair of enable terminals of the stabilization stage with first and second shifted phase signals that are negated and suitably level shifted with respect to the first and second distinct phase signals supplied to the first pair of enable terminals of the stabilization stage, and the digital level shifter circuits each comprise an output circuit portion comprising a transistor having a control terminal that receives one of the first and second input signals, a first terminal that receives one of the first and second distinct phase signals, and a second terminal that supplies one of the first and second shifted phase signals that is negated and suitably level shifted with respect to the one distinct phase signal.

13. The charge pump circuit according to claim 12, wherein the first and second shifted phase signals are overlapped to provide a transient resistive drop that protects against overvoltages at a gate terminal of the second transistor.

14. The charge pump circuit according to claim 12, wherein a body terminal of the transistor of the output circuit portion of the digital level shifter circuit is biased at a value of the supply voltage.

15. The charge pump circuit according to claim 12, wherein the digital level shifter circuits each further comprise an input circuit portion that receives the other of the of the first and second input signals and supplies the one distinct phase signal to the output circuit portion of the digital level shifter circuit.

16. A method for using a stabilization stage to drive transistors in first and second charge pump stages that are interconnected by an intermediate circuit node, the stabilization stage being connected to the intermediate circuit node and to control terminals of the transistors, the method comprising:

providing a phase generator that receives first and second input signals, and supplies a first pair of enable terminals of the stabilization stage with first and second distinct phase signals;

providing digital level shifter circuits in the phase generator, the digital level shifter circuits being connected to a second pair of enable terminals of the stabilization stage so as to shift the levels of the first and second distinct phase signals to supply the second pair of enable terminals of the stabilization stage with first and second shifted phase signals that are negated and suitably level shifted with respect to the first and second distinct phase signals supplied to the first pair of enable terminals of the stabilization stage; and providing each of the digital level shifter circuits with an output circuit portion comprising a transistor having a control terminal that receives one of the first and second input signals, a first terminal that receives one of the first and second distinct phase signals, and a second terminal that supplies one of the first and second shifted phase signals that is negated and suitably level shifted with respect to the one distinct phase signal.

17. The method according to claim 16, further comprising the step of providing each of the digital level shifter circuits with an input circuit portion that receives the other of the of the first and second input signals and supplies the one distinct phase signal to the output circuit portion of the digital level shifter circuit.

* * * * *

UNITED STATES PATENT AND TRADEMARK OFFICE
CERTIFICATE OF CORRECTION

| | | |
|---|---|---|
| PATENT NO. | : 8,063,693 B2 | |
| APPLICATION NO. | : 12/559967 | |
| DATED | : November 22, 2011 | |
| INVENTOR(S) | : Conte et al. | |

It is certified that error appears in the above-identified patent and that said Letters Patent is hereby corrected as shown below:

Col. 16, line 10, Claim 9, change "other of the of the first" to --other of the first--.

Col. 17, line 22, Claim 15, change "other of the of the first" to --other of the first--.

Col. 18, lines 24-25, Claim 17, change "other of the of the first" to --other of the first--.

Signed and Sealed this
Seventeenth Day of January, 2012

David J. Kappos
*Director of the United States Patent and Trademark Office*